(12) United States Patent
Wang

(10) Patent No.: US 10,800,308 B2
(45) Date of Patent: Oct. 13, 2020

(54) TWO-IN-ONE CAR CIGARETTE LIGHTER

(71) Applicant: Shenzhen Jiemeisi Industrial Co., Ltd., Shenzhen (CN)

(72) Inventor: Liming Wang, Shenzhen (CN)

(73) Assignee: SHENZHEN JIEMEISI INDUSTRIAL CO., LTD., Shenzhen (CN)

( * ) Notice: Subject to any disclaimer, the term of this patent is extended or adjusted under 35 U.S.C. 154(b) by 324 days.

(21) Appl. No.: 15/974,704

(22) Filed: May 9, 2018

(65) Prior Publication Data
US 2019/0308540 A1 Oct. 10, 2019

(30) Foreign Application Priority Data

Apr. 4, 2018 (CN) .................... 2018 2 0483861 U

(51) Int. Cl.
| H05B 3/40 | (2006.01) |
| H05B 1/00 | (2006.01) |
| H05B 3/48 | (2006.01) |
| B60N 3/14 | (2006.01) |
| F23Q 7/00 | (2006.01) |
| H02J 7/00 | (2006.01) |

(52) U.S. Cl.
CPC .................. B60N 3/14 (2013.01); *F23Q 7/00* (2013.01); *H02J 7/00* (2013.01); *H02J 7/0042* (2013.01)

(58) Field of Classification Search
CPC . H05B 1/0236; H05B 3/0042; H05B 3/40–50
See application file for complete search history.

(56) References Cited

U.S. PATENT DOCUMENTS

| 8,371,709 B2* | 2/2013 | Cheng | B60N 3/14 219/267 |
| 2013/0043230 A1* | 2/2013 | Schwarzbach | H05B 1/0213 219/202 |
| 2013/0200063 A1* | 8/2013 | Cooke | A47J 41/0044 219/439 |
| 2014/0123989 A1* | 5/2014 | LaMothe | H05B 3/06 131/328 |
| 2015/0245659 A1* | 9/2015 | DePiano | B21D 53/06 392/397 |
| 2015/0313287 A1* | 11/2015 | Verleur | A24F 47/008 131/329 |
| 2016/0345626 A1* | 12/2016 | Wong | H02J 7/0045 |
| 2019/0116880 A1* | 4/2019 | Lau | H05B 3/46 |

* cited by examiner

*Primary Examiner* — Michael A LaFlame, Jr.

(57) ABSTRACT

A two-in-one car cigarette lighter includes a first housing, a second housing connected to the first housing and a heater partially received in the second housing. The first and second housings cooperatively form a receiving room for receiving a battery and a PCB therein. The battery is electrically connected to the PCB and the PCB is tightly fixed with the first housing. A first port and a second port are perpendicularly and electrically connected to the PCB and formed parallel to each other. The second housing includes a first mounting recess so that the heater can pass through the first mounting recess to electrically connect to the PCB. The structure can accordingly not only realize the function of a cigarette lighter, but also have at least one charging interface to conveniently and optionally charge mobile phones, tablet computers and other electronic devices through the charging interface.

20 Claims, 3 Drawing Sheets

TWO-IN-ONE CAR CIGARETTE LIGHTER

BACKGROUND

1. Technical Field

The present disclosure generally relates to cigarette lighters field, and especially relates to a two-in-one car cigarette lighter.

2. Description of Related Art

Nowadays, with the development of the economy, people's living standards are getting higher and higher so that cars have entered thousands of families. A cigarette lighter interface of the car is capable of heating the cigarette lighter so that the cigarette lighter can reach the temperature at which the cigarette is lit. However, a conventional cigarette lighter only has the function of lighting a cigarette. When a person inside the car wants to charge their electronic equipments such as mobile phones or tablet computers via the cigarette lighter interface, he must replace the cigarette lighter with a car charger in order to solve the problem, which is very inconvenient.

SUMMARY

The disclosure relates to a two-in-one car cigarette lighter which may accordingly not only realize the function of a cigarette lighter, but also have at least one charging interface to conveniently and optionally charge mobile phones, tablet computers and other electronic devices through the charging interface.

In one aspect, a two-in-one car cigarette lighter includes: a first housing, a second housing connected to the first housing and a heater partially received in the second housing, the first and second housings cooperatively forming a receiving room for receiving a battery and a printed circuit board (PCB) therein. The battery is electrically connected to the PCB and the PCB is tightly fixed with the first housing. A first port and a second port each are perpendicularly and electrically connected to the PCB and formed parallel to each other. The second housing includes a first mounting recess formed thereon so that the heater can pass through the first mounting recess to electrically connect to the PCB.

Wherein the cigarette lighter further includes a first U-shaped electrical device electrically connected to a low portion of the PCB and a second spring-shaped electrical device electrically connected to the bottom of the PCB.

Wherein the cigarette lighter further includes a pair of first terminals extending along an axial direction of the first housing and symmetrically arranged on the lateral wall of the first housing to removably connect with the first housing, and a second terminal extending downward from the bottom of the first housing along the axial direction of the first housing to removably connect with the first housing, the pair of first terminals electrically connected to two opposite ends of the first electrical device and the second terminal electrically connected to the second electrical device.

Wherein the first housing is generally a stepped-hollow-cylinder structure with an upper end opening, and the second housing is generally a hollow-cylinder structure with a lower end opening, the second housing overlying on the upper end of the first housing. The first housing includes a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the first body portion and the radial diameter of the first body portion smaller than that of the connecting portion.

Wherein the cigarette lighter further includes a switch electrically connected to the PCB and the first housing includes a wedge-shaped installing slot to tightly fix with the switch. When the switch is activated, the heater heats and ignites the cigarette by consuming electrical power within the battery.

Wherein the first housing further includes a second mounting recess for the switch passing therethrough, the wedge-shaped installing slot is formed on an inner side of the first housing along the axial direction of the first housing and opposite to the second mounting recess.

Wherein the second housing includes a third mounting recess for the switch passing therethrough.

Wherein the first housing further includes a fourth mounting recess for the first and second ports respectively passing therethrough.

Wherein the second housing further includes a fifth mounting recess connected with the first port.

Wherein the second housing further includes a sixth mounting recess connected with the second port.

Wherein the second mounting recess and the fourth mounting recess are respectively extended from the upper end of the outer circumferential sidewall of the first body portion to the connecting portion along the axial direction of the first body portion; the second mounting recess and the fourth mounting recess formed opposite to each other, and the diameter of the second mounting recess in the radial direction of the first body portion less than that of the fourth mounting recess.

Wherein the second housing includes an upper wall and a cylindrical sidewall connected to the upper wall, the first mounting recess arranged on the middle of the upper wall along the axial direction of the second housing, and the third mounting recess arranged on the sidewall along the axial direction of the second housing to correspond to the second mounting recess; the fifth and sixth mounting recesses respectively arranged on the sidewall along the radial direction of the second housing and each positioned opposite to the third mounting recess; the fifth mounting recess positioned on the upper end of the sixth mounting recess and corresponding to the first port, and the sixth mounting recess corresponding to the second port.

Wherein the first port is a DP3.0 port and the second port is a USB port.

In another aspect, a two-in-one car cigarette lighter according to an exemplary embodiment of the present disclosure includes a first stepped-hollow-cylinder-shaped housing with an upper end opening thereof, a second hollow-cylinder-shaped housing with a lower end opening thereof, the second housing covered on the upper end opening of the first housing, a heater partially received in the second housing, a battery and a printed circuit board (PCB) respectively received in a receiving room formed between the first housing and the second housing, the battery electrically connected to the PCB and the PCB tightly fixed in the first housing, a first port and a second port each perpendicularly and electrically connected to the PCB and formed parallel to each other, a first U-shaped electrical device and a second spring-shaped electrical device each electrically connected to the PCB, a pair of first terminals and a second terminal each removably connected to the first housing, and a switch received in the housing and electrically connected to the PCB. The second housing includes a first mounting recess formed on the middle thereof so that the heater can pass through the first mounting recess to electrically connect to the PCB, the pair of first terminals is electrically connected to two opposite ends of the first electrical device and the second terminal is electrically connected to the second electrical device.

Wherein the pair of first terminals extends along an axial direction of the first housing to symmetrically arrange on the lateral wall of the first housing so as to electrically connect to the PCB. The second terminal extends downward from the bottom of the first housing along the axial direction of the first housing so as to electrically connect the bottom of the PCB.

Wherein the first housing includes a first hollow-cylinder-shaped body portion, a connecting portion connected to the bottom of the first body portion and a second body portion connected to the bottom of the connecting portion. The first body portion, the connecting portion and the second body portion are coaxially formed with each other, and the radial diameter of the second body portion is smaller than that of the first body portion and the radial diameter of the first body portion is smaller than that of the connecting portion.

Wherein the first housing includes a wedge-shaped installing slot formed on an inner side of the first housing along the axial direction of the first housing to tightly fix with the switch. When the switch is activated, the heater heats and ignites the cigarette by consuming electrical power within the battery.

Wherein the first body portion includes a second mounting recess formed opposite to the installing slot, a fourth mounting recess formed opposite to the second mounting recess. The second mounting recess and the fourth mounting recess are respectively extended from the upper end of the outer circumferential sidewall of the first body portion to the connecting portion along the axial direction of the first body portion, and the diameter of the second mounting recess in the radial direction of the first body portion is less than that of the fourth mounting recess.

Wherein the second housing includes an upper wall and a cylindrical sidewall connected to the upper wall, the first mounting recess arranged on the middle of the upper wall along the axial direction of the second housing, a third mounting recess arranged on the sidewall along the axial direction of the second housing to correspond to the second mounting recess, the switch passing through the second mounting recess and the third mounting recess in turn.

Wherein a fifth mounting recess and a sixth mounting recess are respectively arranged on the sidewall along the radial direction of the second housing and each positioned opposite to the third mounting recess, the fifth mounting recess positioned on the upper end of the sixth mounting recess and corresponding to the first port, and the sixth mounting recess corresponding to the second port.

The present disclosure provides the advantages as below.

The two-in-one car cigarette lighter can accordingly not only realize the function of a cigarette lighter, but also have at least one charging interface to conveniently and optionally charge mobile phones, tablet computers and other electronic devices through the charging interface.

DETAILED DESCRIPTION

Figure 1:
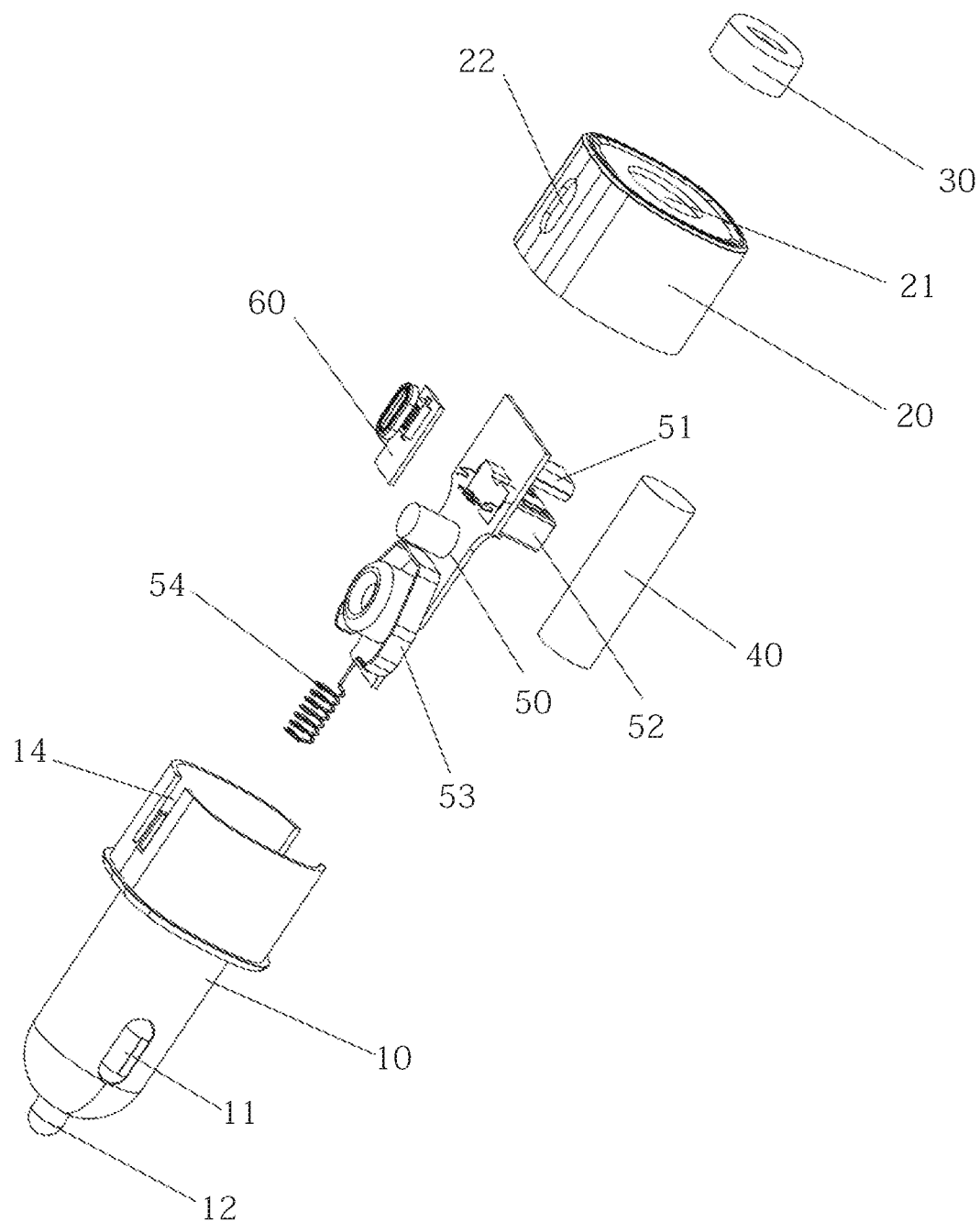
FIG. 1 is an exploded, schematic view of the two-in-one car cigarette lighter in accordance with an exemplary embodiment.

The disclosure is illustrated by way of example and not by way of limitation in the figures of the accompanying drawings, in which like reference numerals indicate similar elements.

Referring to FIGS. 1-4, the two-in-one car cigarette lighter according to an exemplary embodiment includes a first housing 10, a second housing 20 connected to the first housing 10 and a heater 30 partially received in the second housing 20. The first housing 10 and the second housing 20 are cooperatively formed a receiving room 100 for receiving a battery 40 and a printed circuit board (PCB) 50 therein. The battery 40 is electrically connected to the PCB 50 and the PCB 50 is tightly fixed with the first housing 10. The car cigarette lighter further includes a first port 51 and a second port 52 each perpendicularly and electrically connected to the PCB 50 and formed parallel to each other. The second housing 20 includes a first mounting recess 21 formed thereon so that the heater 30 can pass through the first mounting recess 21 to electrically connect to the PCB 50. The heater 30 is tightly fixed with the second housing 20. The first housing 10 includes a fourth mounting recess 15 for both the first port 51 and the second port 52 passing through the fourth mounting recess 15.

In the exemplary embodiment of the present disclosure, the first housing 10 is generally a stepped-hollow-cylinder structure with an upper end opening, and the second housing 20 is generally a hollow-cylinder structure with a lower end opening. The second housing 20 is covered on the upper end of the first housing 10. The first housing 10 includes a first hollow-cylinder-shaped body portion 10a, a connecting portion 10b connected to the bottom of the first body portion 10a and a second body portion 10c connected to the bottom of the connecting portion 10b. The first body portion 10a, the connecting portion 10b and the second body portion 10c are coaxially formed with each other. The radial diameter of the second body portion 10c is smaller than that of the first body portion 10a and the radial diameter of the first body portion 10a is smaller than that of the connecting portion 10b.

In the exemplary embodiment of the present disclosure, when the two-in-one car cigarette lighter starts working, the current is charged to the battery 40 through the PCB 50 so that the battery 40 supplies power to the heater 30. The first port 51 and the second port 52 are also energized to supply power externally. Thus, the mobile phones, the tablet computers and other electronic devices can be charged via the first port 51 and the second port 52. The present disclosure of the two-in-one car cigarette lighter can not only realize the function of a cigarette lighter, but also have at least one charging interface to conveniently and optionally charge mobile phones, tablet computers and other electronic devices through the charging interface.

Referring to FIG. 1, the two-in-one car cigarette lighter further includes a first U-shaped electrical device 53 electrically connected to a low portion of the PCB 50, a second spring-shaped electrical device 54 electrically connected to the bottom of the PCB 50, a pair of first terminals 11 extending along an axial direction of the first housing 10 and symmetrically arranged on the lateral wall of the first housing 11 to removably connect with the first housing 11, and a second terminal 12 extending downward from the bottom of the first housing 10 along the axial direction of the first housing 10 to removably connect with the first housing 10. The pair of first terminals 11 is electrically connected to two opposite ends of the first electrical device 53 and the second terminal 12 is electrically connected to the second electrical device 54.

In the exemplary embodiment of the present disclosure, when the two-in-one car cigarette lighter is inserted into a cigarette lighter interface of the car, all the pair of first terminals 11 and the second terminal 12 are partially received in the receiving room 100. At this time, all the first and second terminals 11, 12 are electrically connected to the cigarette lighter interface, respectively, thereby the cigarette lighter interface can supply power to the two-in-one car cigarette lighter.

Figure 2:
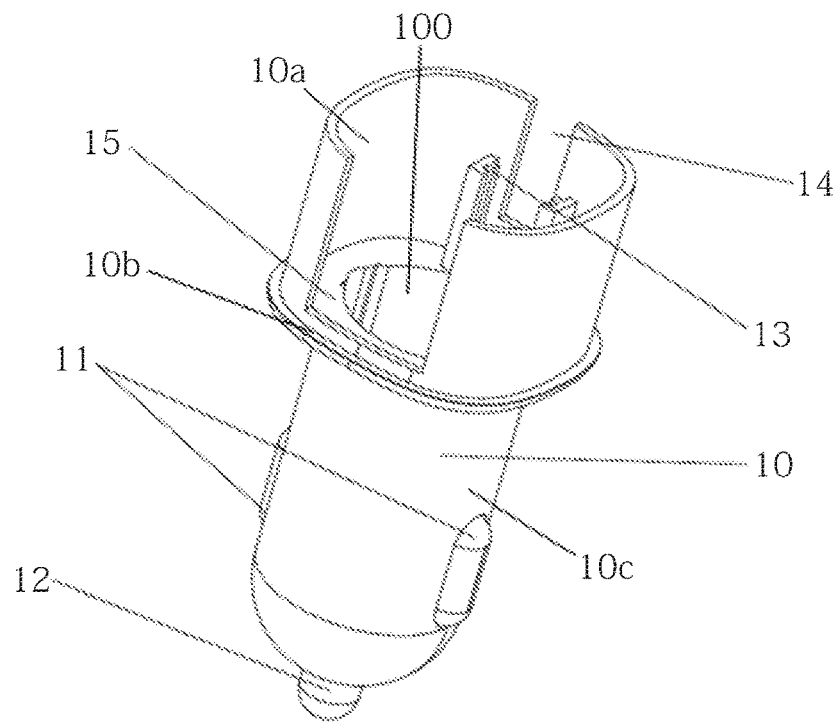
FIG. 2 is a schematic view of a first housing of the two-in-one car cigarette lighter of FIG. 1.

Referring to FIG. 1 and FIG. 2, the two-in-one car cigarette lighter further includes a switch 60 electrically connected to the PCB 50. The first housing 10 includes a wedge-shaped installing slot 13 to tightly fix with the switch 60. When the switch 60 is activated, the heater 30 heats and ignites the cigarette by consuming electrical power within the battery 40.

In the exemplary embodiment of the present disclosure, the switch 60 is a button switch structure and is provided for controlling the heater 30 to heat. When needing to use the cigarette lighter function, the two-in-one car cigarette lighter is removed from the cigarette lighter interface and the switch 60 is pressed along the direction perpendicular to the first housing 10. That is to say, the switch 60 is pressed along the radial direction of the first housing 10. At this time, the heater 30 consumes the power within the battery 40 to start heating the cigarette. After the cigarette is ignited, the switch 60 is again pressed to stop the heater 30 heating, and then the two-in-one car cigarette lighter is inserted back into the cigarette lighter interface. The present disclosure of the two-in-one care cigarette lighter is provided with overload protection. When the temperature of the heater 30 reaches a preset temperature of the car cigarette lighter, the heater 30 can be automatically stopped heating even if the switch 60 is not pressed again, thereby the user's safety is protected.

Figure 3:
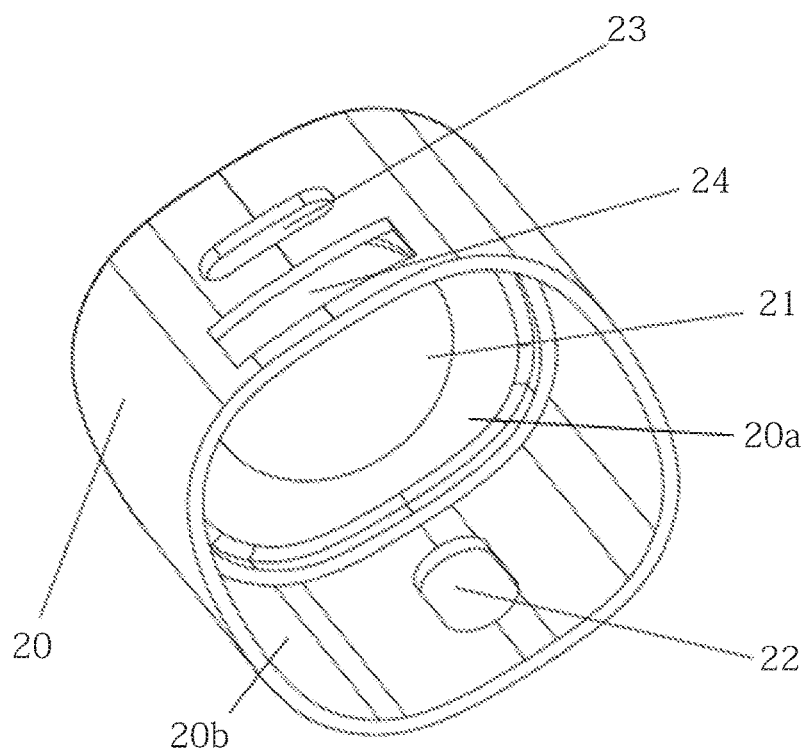
FIG. 3 is a schematic view of a second housing of the two-in-one car cigarette lighter of FIG. 1.

Referring to FIGS. 1-3, the first housing 10 further includes a second mounting recess 14 for the switch 60 passing therethrough. The second housing 20 includes a third mounting recess 22 for the switch 60 passing therethrough.

In the exemplary embodiment of the present disclosure, the switch 60 passes through the second mounting recess 14 and the third mounting recess 22 in turn, thereby a protruding structure is formed on the second housing 20 by the switch 60 in order to facilitate the user to press the switch 60.

Figure 4:
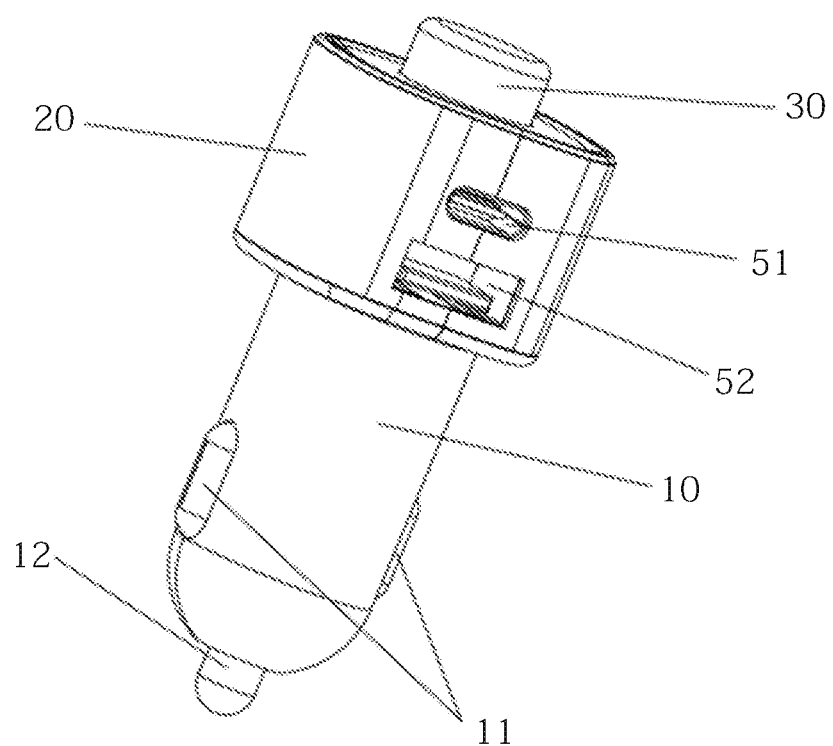
FIG. 4 is a schematic assembly view of the two-in-one car cigarette lighter of FIG. 1.

Referring to FIGS. 3-4, the second housing 20 further includes a fifth mounting recess 23 connected with the first port 51 and a sixth mounting recess 24 connected with the second port 52.

In the exemplary embodiment of the present disclosure, the size of the fifth mounting recess 23 is consistent with the first port 51, while the size of the sixth mounting recess 24 is also consistent with the second port 52. Both the first port 51 and the second port 52 are received in the second housing 20. In this way, the first and second ports 51, 52 can be protected from damaging by external object, thereby the span-life of the two-in-one car cigarette lighter is improved.

In the exemplary embodiment of the present disclosure, the installing slot 13 is a wedge-shaped structure and formed on an inner side of the first housing 10 along the axial direction of the first housing 10 and opposite to the second mounting recess 14. The second mounting recess 14 and the fourth mounting recess 15 are respectively extended from the upper end of the outer circumferential sidewall of the first body portion 10a to the connecting portion 10b along the axial direction of the first body portion 10a. The second mounting recess 14 and the fourth mounting recess 15 are formed opposite to each other, and the diameter of the second mounting recess 14 in the radial direction of the first body portion 10a is less than that of the fourth mounting recess 15. The pair of first terminals 11 is symmetrically formed on the lower end of the second body portion 10c along the axial direction of the first housing 10, and the second terminal 12 is extended downward from the bottom of the second body portion 10c along the axial direction of the first housing 10.

In the exemplary embodiment of the present disclosure, the second housing 20 includes an upper wall 20a and a cylindrical sidewall 20b connected to the upper wall 20a. The first mounting recess 21 is arranged on the middle of the upper wall 20a along the axial direction of the second housing 20, and the third mounting recess 22 is arranged on the sidewall 20b along the axial direction of the second housing 20 to correspond to the second mounting recess 14. The fifth and sixth mounting recesses 23, 24 are respectively arranged on the sidewall 20b along the radial direction of the second housing 20 and each is positioned opposite to the third mounting recess 22. The fifth mounting recess 23 is positioned on the upper end of the sixth mounting recess 24 and corresponding to the first port 51, and the sixth mounting recess 24 is corresponding to the second port 52.

Referring to FIG. 1 and FIG. 4, the first port 51 is a DP3.0 port and the second port 52 is a USB port.

In the exemplary embodiment of the present disclosure, the first port 51 is the DP3.0 port and the second port 52 is the USB port, which can meet the charge requirements of almost all mobile phones, tablets and other electronic devices on the market and ensure the use range of the two-in-one car cigarette lighter.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A two-in-one car cigarette lighter comprising: a first housing, a second housing connected to the first housing and a heater partially received in the second housing, the first and second housings cooperatively forming a receiving room for receiving a battery and a printed circuit board (PCB) therein, the battery electrically connected to the PCB and the PCB tightly fixed with the first housing; a first port and a second port each perpendicularly and electrically connected to the PCB and formed parallel to each other; and wherein the second housing comprises a first mounting recess formed thereon so that the heater can pass through the first mounting recess to electrically connect to the PCB;

wherein the first housing is generally a stepped-hollow-cylinder structure with an upper end opening, and the second housing is generally a hollow-cylinder structure with a lower end opening, the second housing overlying on the upper end of the first housing; the first housing comprising a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the first body portion and the radial diameter of the first body portion smaller than that of the connecting portion.

2. The two-in-one car cigarette lighter as claimed in claim 1, wherein the cigarette lighter further comprises a first U-shaped electrical device electrically connected to a low portion of the PCB and a second spring-shaped electrical device electrically connected to the bottom of the PCB.

3. The two-in-one car cigarette lighter as claimed in claim 2, wherein the cigarette lighter further comprises a pair of first terminals extending along an axial direction of the first housing and symmetrically arranged on a lateral wall of the first housing to removably connect with the first housing, and a second terminal extending downward from the bottom of the first housing along the axial direction of the first housing to removably connect with the first housing, the pair of first terminals electrically connected to two opposite ends of the first electrical device and the second terminal electrically connected to the second electrical device.

4. The two-in-one car cigarette lighter as claimed in claim 1, wherein the cigarette lighter further comprises a switch electrically connected to the PCB and the first housing comprises a wedge-shaped installing slot to tightly fix with the switch; when the switch is activated, the heater heats and ignites the cigarette by consuming electrical power within the battery.

5. The two-in-one car cigarette lighter as claimed in claim 4, wherein the first housing further comprises a second mounting recess for the switch passing therethrough, the wedge-shaped installing slot is formed on an inner side of the first housing along the axial direction of the first housing and opposite to the second mounting recess.

6. The two-in-one car cigarette lighter as claimed in claim 5, wherein the second housing comprises a third mounting recess for the switch passing therethrough.

7. The two-in-one car cigarette lighter as claimed in claim 6, wherein the first housing further comprises a fourth mounting recess for the first and second ports respectively passing therethrough.

8. The two-in-one car cigarette lighter as claimed in claim 7, wherein the second housing further comprises a fifth mounting recess connected with the first port.

9. The two-in-one car cigarette lighter as claimed in claim 8, wherein the second housing further comprises a sixth mounting recess connected with the second port.

10. The two-in-one car cigarette lighter as claimed in claim 9, wherein the second mounting recess and the fourth mounting recess are respectively extended from the upper end of the outer circumferential sidewall of the first body portion to the connecting portion along the axial direction of the first body portion; the second mounting recess and the fourth mounting recess formed opposite to each other, and the diameter of the second mounting recess in the radial direction of the first body portion less than that of the fourth mounting recess.

11. The two-in-one car cigarette lighter as claimed in claim 10, wherein the second housing comprises an upper wall and a cylindrical sidewall connected to the upper wall, the first mounting recess arranged on the middle of the upper wall along the axial direction of the second housing, and the third mounting recess arranged on the sidewall along the axial direction of the second housing to correspond to the second mounting recess; the fifth and sixth mounting recesses respectively arranged on the sidewall along the radial direction of the second housing and each positioned opposite to the third mounting recess; the fifth mounting recess positioned on the upper end of the sixth mounting recess and corresponding to the first port, and the sixth mounting recess corresponding to the second port.

12. The two-in-one car cigarette lighter as claimed in claim 1, wherein the first port is a DP3.0 port and the second port is a USB port.

13. A two-in-one car cigarette lighter comprising:
a first stepped-hollow-cylinder-shaped housing with an upper end opening thereof;
a second hollow-cylinder-shaped housing with a lower end opening thereof, the second housing covered on the upper end opening of the first housing;
a heater partially received in the second housing;
a battery and a printed circuit board (PCB) respectively received in a receiving room formed between the first housing and the second housing, the battery electrically connected to the PCB and the PCB tightly fixed in the first housing;
a first port and a second port each perpendicularly and electrically connected to the PCB and formed parallel to each other;
a first U-shaped electrical device and a second spring-shaped electrical device each electrically connected to the PCB;
a pair of first terminals and a second terminal each removably connected to the first housing;
a switch received in the housing and electrically connected to the PCB; and wherein the second housing comprises a first mounting recess formed on the middle thereof so that the heater can pass through the first mounting recess to electrically connect to the PCB, the pair of first terminals is electrically connected to two opposite ends of the first electrical device and the second terminal is electrically connected to the second electrical device.

14. The two-in-one car cigarette lighter as claimed in claim 13, wherein the pair of first terminals extends along an axial direction of the first housing to symmetrically arrange on a lateral wall of the first housing so as to electrically connect to the PCB, the second terminal extends downward from the bottom of the first housing along the axial direction of the first housing so as to electrically connect the bottom of the PCB.

15. The two-in-one car cigarette lighter as claimed in claim 13, wherein the first housing comprises a first hollow-cylinder-shaped body portion, a connecting portion connected to the bottom of the first body portion and a second body portion connected to the bottom of the connecting portion; the first body portion, the connecting portion and the second body portion coaxially formed with each other, the radial diameter of the second body portion smaller than that of the first body portion and the radial diameter of the first body portion smaller than that of the connecting portion.

16. The two-in-one car cigarette lighter as claimed in claim 15, wherein the first housing comprises a wedge-shaped installing slot formed on an inner side of the first housing along the axial direction of the first housing to tightly fix with the switch; when the switch is activated, the heater heats and ignites the cigarette by consuming electrical power within the battery.

17. The two-in-one car cigarette lighter as claimed in claim 16, wherein the first body portion comprises a second mounting recess formed opposite to the installing slot, a fourth mounting recess formed opposite to the second mounting recess, the second mounting recess and the fourth mounting recess are respectively extended from the upper end of the outer circumferential sidewall of the first body portion to the connecting portion along the axial direction of the first body portion, and the diameter of the second mounting recess in the radial direction of the first body portion is less than that of the fourth mounting recess.

18. The two-in-one car cigarette lighter as claimed in claim 17, wherein the second housing comprises an upper wall and a cylindrical sidewall connected to the upper wall, the first mounting recess arranged on the middle of the upper wall along the axial direction of the second housing, a third mounting recess arranged on the sidewall along the axial direction of the second housing to correspond to the second mounting recess, the switch passing through the second mounting recess and the third mounting recess in turn.

19. The two-in-one car cigarette lighter as claimed in claim 18, wherein a fifth mounting recess and a sixth mounting recess are respectively arranged on the sidewall along the radial direction of the second housing and each positioned opposite to the third mounting recess, the fifth mounting recess positioned on the upper end of the sixth mounting recess and corresponding to the first port, and the sixth mounting recess corresponding to the second port.

20. A two-in-one car cigarette lighter comprising:
a first housing;
a second housing connected to the first housing;
a battery and a printed circuit board (PCB) received in a receiving room cooperatively formed by the first housing and the second housing, the battery electrically connected to the PCB and the PCB tightly fixed in the first housing;
a heater partially received in the second housing and configured to be electrically connected to the PCB;
a first port and a second port electrically and perpendicularly connected to the PCB, respectively;
a first electrical device disposed at a lower portion of the PCB and electrically connected to the PCB;
a second electrical device disposed at a bottom of the PCB and electrically connected to the PCB;
two first terminals removably connected to the first housing and electrically connected to two opposite ends of the first electrical device; and
a second terminal removably connected to the first housing and electrically connected to the second electrical device.

* * * * *